United States Patent
Wipiejewski (10) Patent No.: US 6,665,105 B2
(45) Date of Patent: Dec. 16, 2003

(54) TUNABLE ELECTRO-ABSORPTION MODULATOR

(75) Inventor: Torsten Wipiejewski, Santa Barbara, CA (US)

(73) Assignee: Agility Communications, Inc., Goleta, CA (US)

( * ) Notice: Subject to any disclaimer, the term of this patent is extended or adjusted under 35 U.S.C. 154(b) by 0 days.

(21) Appl. No.: 09/920,319

(22) Filed: Jul. 31, 2001

(65) Prior Publication Data

US 2003/0025976 A1 Feb. 6, 2003

(51) Int. Cl.$^7$ ................................................ G02F 1/01
(52) U.S. Cl. ........................................................ 359/240
(58) Field of Search ................................. 359/240, 237, 359/247, 254, 266, 282, 288, 295, 315, 322

(56) References Cited

U.S. PATENT DOCUMENTS

| | | | |
|---|---|---|---|
| 4,802,182 A | * 1/1989 | Thornton et al. | 372/50 |
| 4,896,325 A | 1/1990 | Coldren | |
| 5,079,618 A | * 1/1992 | Farnworth | 257/713 |
| 5,088,097 A | 2/1992 | Ono et al. | |
| 5,208,878 A | * 5/1993 | Thulke | 385/14 |
| 5,473,625 A | * 12/1995 | Hansen et al. | 372/96 |
| 5,790,581 A | 8/1998 | Nitta | |
| 5,841,799 A | 11/1998 | Hiroki | |
| 5,889,900 A | * 3/1999 | Hallemeier | 385/11 |
| 6,477,283 B1 | * 11/2002 | Shimizu et al. | 385/3 |
| 6,516,017 B1 | * 2/2003 | Matsumoto | 372/50 |

OTHER PUBLICATIONS

I.A. Avrutsky et al., "Design of Widely Tunable Semiconductor Lasers and the Concept of Binary Superimposed Gratings (BSG's)," IEEE Journal of Quantum Elec., Apr. 1998, 34(4): 729–741.

L.A. Coldren et al., "Photonic Integrated Circuits," Diode Lasers and Photonic Integrated Circuits, John Wiley & Sons, 1995, ch. 8:342–391.

L.A. Coldren et al., "Properties of Widely–Tunable Integrated WDM Sources and Receivers," 1997 Annual Meeting (LEOS), San Francisco, CA, USA, Nov. 1997, Paper No. TuY1, 331–332 [62–63].

L.A. Coldren et al., "Tunable Lasers for Photonic Integrated Circuits," IEEE Summer Topical on Integrated Optoelectronics, Lake Tahoe, NV, USA, Jul. 1994, Paper No. W4.1, 88–89.

L.A. Coldren, "Widely–Tunable and Vertical–Cavity Lasers: DBR's on Different Planes," Integrated Photonics Research, San Francisco, CA, USA, Feb. 1994, Paper No. ThA3–1, 75–76.

(List continued on next page.)

*Primary Examiner*—Hung Xuan Dang
*Assistant Examiner*—Joseph Martinez
(74) *Attorney, Agent, or Firm*—Gates & Cooper LLP (57) ABSTRACT

A tunable modulator includes an epitaxial structure formed on a substrate. The epitaxial structure includes a waveguide for light guiding, generally in form of a ridge, a trench for thermal insulation and an integrated heating element which, when a current is passed therethrough, heats the modulator and in turn changes the effective bandgap. This alters the wavelength that is best modulated resulting in a tunable modulator in accordance with the present invention.
Literature
[1] Beck Mason, Greg A. Fish, Steven P. DenBaars, Larry A. Coldren, "Widely Tunable Sampled Grating DBR Laser with Integrated Electroabsorption Modulator," IEEE Photonics Technology Letters, vol. 11, no. 6 pp. Jun. 4–6, 1999 FIG. 4.
[2] Lucent/Agere Application Note TN00008 on electroabsorption modulators (EML), May 2000.

32 Claims, 4 Drawing Sheets

OTHER PUBLICATIONS

G. Fish et al., "Compact, 4 X 4 InGaAsP–InP Optical Crossconnect with a Scaleable Architecture," IEEE Photonics Tech. Lett., Sep. 1998, 10(9): 42–44.

G. Fish et al., "Improved Compositional Uniformity of InGaAsP Grown by MOCVD Through Modification of the Susceptor Temperature Profile," Journal of Crystal Growth, 1997, 32–38.

G. Fish et al., "InGaAsP/InP Scaleable, Photonic Crossconnects Using Optically Amplified Suppressed Modal Interference Switch Arrays," Integrated Photonics Research '98, Victoria, Canada, Mar. 1998, Paper No. ITuE4, 243–245 [39–41].

G. Fish et al., "InGaAsP/InP Suppressed Modal Interference Switches with Integrated Curved Amplifiers for Scaleable Photonic Crossconnects," Optical Fiber Conference '98 San Jose, CA, USA, Feb. 1998, Paper No. TuH4, 1pp.

G. Fish et al., "Suppressed Modal Interference Switches with Integrated Curved Amplifiers for Scaleable Photonic Crossconnects," IEEE Photonics Tech. Lett., Feb. 1998, 10(2)28–30.

M.E. Heimbuch et al., "Tertiarybutylarsine and Tertiarybutylphosphine for the MOCVD Growth of Low Threshold 1.55 $\mu$m $In_xGa_{1-x}As/InP$ Quantum–Well Lasers," Journal of Elec. Materials, 1994, 23(2): 77–81.

H. Ishii et al., "Broad–range Wavelength Coverage (62.4nm) with Superstructure–Grating DBR Laser," Elec. Lett., Feb. 29, 1996, 32(5): 454–455.

H. Ishii et al., "Quasicontinuous Wavelength Tuning in Super–Structure–Grating (SSG) DBR Lasers," IEEE Journal of Quantum Elec., Mar. 1996, 32(3): 433–441.

Y–H. Jan et al., "Widely Tunable Integrated Filter/Receiver with Apodized Grating–Assisted Codirectional Coupler (INVITED)," SPIE Photonics West '98, San Jose, CA, USA, Jan. 1998, Paper No. 3290–232: 24–27.

V. Jayaraman et al., "Continuous–Wave Operation of Sampled Grating Tunable Lasers with 10 mwatt Output Power,>60 nm Tuning, and Monotonic Tuning Characteristics," Indium Phosphide Conference, Santa Barbara, CA, USA, Mar. 1994, 33–36 [82–85].

V. Jayaraman et al., "Demonstration of Broadband Tunability in a Semiconductor Laser Using Sampled Gratings," Appl. Phys. Lett., May 1992, 60(19): 110–112.

V. Jayaraman et al., "Extended Tuning Range in Sampled Grating DBR Lasers," IEEE Photonics Tech. Lett., May 1993, 5(5): 103–105.

V. Jayaraman et al., "Extended Tuning Range Semiconductor Lasers with Sampled Gratings," LEOS '91, San Jose, CA, USA, Nov. 1991, Paper No. SDL15.5: 82 [113].

V. Jayaraman et al., "Theory, Design, and Performance of Extended Tuning Range Semiconductor Lasers with Sampled Gratings," IEEE Journal of Quantum Elec., Jun. 1993, 29(6): 92–102.

V. Jayaraman et al., "Very Wide Tuning Range in a Sampled Grating DBR Laser," Int. Semiconductor Laser Conference, Takamatsu, Japan, Sep. 1992, 108–109.

V. Jayaraman, et al., "Wide Tunability and Large Mode–Suppression in a Multi–Section Semiconductor Laser Using Sampled Gratings," Integrated Photonics Research '92, New Orleans, LA, USA, Apr. 1992, Paper No. WF1, 306–307 [106–107].

V. Jayaraman et al., "Widely Tunable Continuous–Wave InGaAsP/InP Sampled Grating Lasers," Elec. Lett., Sep. 1994, 30(18): 90–91.

S–L. Lee et al., "Direct Modulation of Widely Tunable Sampled Grating DBR Lasers," SPIE, 1996, 2690(223): 223–230 [64–71].

S–L. Lee et al., "Dynamic Responses of Widely Tunable Sampled Grating DBR Lasers," Photonics Tech. Lett., Dec. 1996, 8(12): 72–74.

S–L. Lee et al., "Field–Induced Guide/Antiguide Modulators on InGaAsP/InP," Elec. Lett., Jun. 9, 1994, 30(12): 954–955 [86–87].

S–L. Lee et al., "Integration of Semiconductor Laser Amplifiers with Sampled Grating Tunable Lasers for WDM Applications," IEEE Journal of Selected Topics in Quantum Elec., Apr. 1997, 3(2): 49–61.

B. Mason et al., "Design of Sampled Grating DBR Lasers with Integrated Semiconductor Optical Amplifiers," IEEE Photonics Tech. Lett., Jul. 2000, 12(7): 1–3.

B. Mason et al., "Directly Modulated Sampled Grating DBR Lasers for Long–Haul WDM Communications Systems," IEEE Photonics Tech. Lett., 9(3): 46–48.

B. Mason et al., "Monolithic Integration of a Widely Tunable Laser and an Electro–Absorption Modulator," Integrated Photonics Research '99, Santa Barbara, CA, USA, Jul. 1999, Paper No. RME2, 53–55 [7–9].

B. Mason et al., "Ridge Waveguide Sampled Grating DBR Lasers with 22–nm Quasi–Continuous Tuning Range," IEEE Photonics Technology Letters, Sep. 1998, 10(9): 19–21.

B. Mason et al., "Sampled Grating DBR Lasers with 22nm Quasi–Continuous Tuning and Monolithically Integrated Wavelength Monitors," Int'l. Semiconductor Laser Conf. '98, Nara, Japan, Oct. 1998, Paper No. ThC4, 22–23.

B. Mason et al., "Sampled Grating DBR Lasers with Integrated Wavelength Monitoring," Integrated Photonics Research '98, Victoria, Canada, Mar. 1998, Paper No. IMD5, 52–54 [13–15].

B. Mason et al., "Tunable Sampled–Grating DBR Lasers with Integrated Wavelength Monitors," IEEE Photonics Tech. Lett., Aug. 1998, 10(8): 16–18.

B. Mason et al., "Widely Tunable Lasers for Wavelength––Division Multiplexed Communications," Optical Fiber Communication '97, Dallas, TX, USA, Feb. 1997, 45.

B. Mason et al., "Widely Tunable Sampled Grating DBR Laser with Integrated Electroabsorption Modulator," IEEE Photonics Tech. Lett., Jun. 1999, 11(6): 4–6.

D.M. Tennant et al., "Multiwavelength Distributed Bragg Reflector Laser . . . Grating Mask," J. Vac. Sci. Technol. B, Nov/Dec 1993, 11(6): 2509–2513.

* cited by examiner

TUNABLE ELECTRO-ABSORPTION MODULATOR

BACKGROUND OF THE INVENTION

1. Field of the Invention

This invention relates generally to optical modulators. More particularly, the present invention relates to electro-absorption modulators. And even more particularly, the present invention relates to a tunable electro-absorption modulator and method of use thereof.

2. Brief Description of the Related Art

A laser transmitter for fiber optic networks must emit signals, at a given stable wavelength, modulated at a desired rate with low chirp and an appropriate power, that are then launched into an optical fiber. Current networks have as many as 100 wavelength channels with one laser's output devoted to each channel, and each laser having an external modulator. Significantly greater efficiencies could be realized with a laser transmitter and a modulator included on a chip, wherein the modulated laser is capable of being tuned to cover every channel of a system.

Photonic integration can be used to provide a laser transmitter on a chip, as is well understood in the art. While photonic integration is well known in the art, prior art efforts have been focused on the integration of lasers that are not widely tunable. Kobayashi, N.; Noda, A.; Watanabe, T.; Miura, S.; Odagawa, T.; Ogita, S. "2.5-Gb/s-1200-km transmission of electroabsorption modulator integrated DFB laser with quarter-wavelength-shifted corrugation," IEEE Photonics Technology Letters, vol. 11, (no.8), IEEE, August 1999. p.1039–41; Delprat, D.; Ramdane, A.; Silvestre, L.; Ougazzaden, A.; Delorme, F.; Slempkes, S. "20-Gb/s integrated DBR laser-EA modulator by selective area growth for 1.55-mu m WDM applications," IEEE Photonics Technology Letters, vol.9, no.7, IEEE, July 1997. p.898–900. Large tuning ranges make achieving adequate performance of these functional blocks non-obvious with respect to the teachings of the prior art in general, and the prior art related to narrowly tunable devices in particular. What is needed are photonic integration techniques to construct a widely tunable laser apparatus including an integrated modulator that may be effectively tuned according to the selected output wavelength of the laser output.

Laser diodes with integrated electro-absorption modulators (EAM) are becoming important for modem high-speed optical transmission systems. One advantage of the modulator is the higher bandwidth compared to directly modulated lasers. Another is the lower chirp of the modulated signal.

An electrical field is applied across the waveguide of the modulator to change the absorption characteristics of the semiconductor material. Normally the waveguide is embedded in a pin-junction of semiconductor material to apply the field. The waveguide itself is either undoped or slightly p- or n-type doped. If the semiconductor material is reasonably thick the Franz-Keldysh effect applies. In the case of quantum well material, the Quantum Confined Stark effect causes the change in the absorption behavior. In both cases, the electrical field causes an increased absorption for wavelengths below the bandgap energy. This effect is employed in an electro-absorption modulator. The amount of absorption increase depends on the applied electric field strength and the energy separation of the incoming light to the bandgap energy of the semiconductor.

Due to the coupling of the real part of the refractive index to the imaginary part through the Kramers-Kronig Relation also the refractive index of the semiconductor changes when an electrical field is applied. This causes chirp to the light passing through the modulator. The amount of chirp also depends on the applied electrical field strength and the energy separation of the incoming light to the bandgap energy of the semiconductor. Normally, the chirp of the modulator is lower than directly modulated lasers and can even be negative.

In general, the wavelength of the modulator is adjusted to the lasing wavelength by choosing the right composition of the modulator waveguide. The adjustment of the lasing light to the bandgap energy of the modulator determines the absorption of the modulator at zero bias, the absorption as function of the applied reverse bias voltage (and the extinction ratio if an Rf signal is added to the bias voltage) [1], and the chirp of the modulated signal introduced by the associated change in refractive index [2]. For optimum performance this adjustment needs to be very precise. For relaxed tolerances in the fabrication process it would be advantageous to adjust the bandgap energy of the modulator after fabrication.

In the case of tunable lasers the lasing light wavelength is intended to change, but the modulator waveguide bandgap energy can only be adjusted to a fixed wavelength. Therefore any adjustment of the modulator wavelength to the laser wavelength can only offer a compromise. Although the absorption can be adjusted by adjusting the bias voltage, the amount of absorption change with applied voltage varies. Thus, the applied Rf signal magnitude would need to be adjusted. Additionally, the amount of chirp introduced into the signal cannot be controlled by simply adjusting the bias voltage or the Rf signal, because the chirp depends on the wavelength relative to the bandgap energy of the modulator.

Therefore, what is required in the art is a modulator that may be adjustably configured to substantially maximize the absorption of varying wavelengths of coherent light while minimizing chirp and other unwanted effects on the light.

SUMMARY

Accordingly, an object of the present invention is to provide a tunable electro-absorption modulator that provides for wide tuning.

Another object of the present invention is to provide a diode laser assembly having a tunable electro-absorption modulator formed integrally therewith.

A further object of the present invention is to provide a widely tunable diode laser assembly with an integrated modulator.

Yet another object of the present invention is to provide a diode laser assembly including a tunable electro-absorption modulator with the elements fabricated on a single wafer by common process steps.

Still another object of the present invention enables the wavelength of the modulator in accordance with the present invention to be adjusted independently of any other optical devices on the same substrate or chip, in particular, a laser diode or a tunable laser diode. This enables the optimization of absorption and/or chirp of the modulator. The change of absorption with voltage relates to the Rf extinction ratio, which can then also be adjusted.

Another object of the present invention is to provide a modulator, the bandgap wavelength adjustment of which enables optimization of transmission and chirp of the modulator.

And still another object of the present invention is to provide a modulator portion that may be tuned to more effectively modulate one of a plurality of wavelengths of output light, received at the modulator from the laser resonator portion.

These and other objects of the present invention are achieved in a laser assembly that includes an epitaxial structure formed on a substrate. A laser resonator portion and a modulator portion are formed in the epitaxial structure.

The present invention will be more clearly understood with reference to the accompanying drawings and the following detailed description, in which like reference numerals refer to like parts and where:

DETAILED DESCRIPTION

Figure 1:
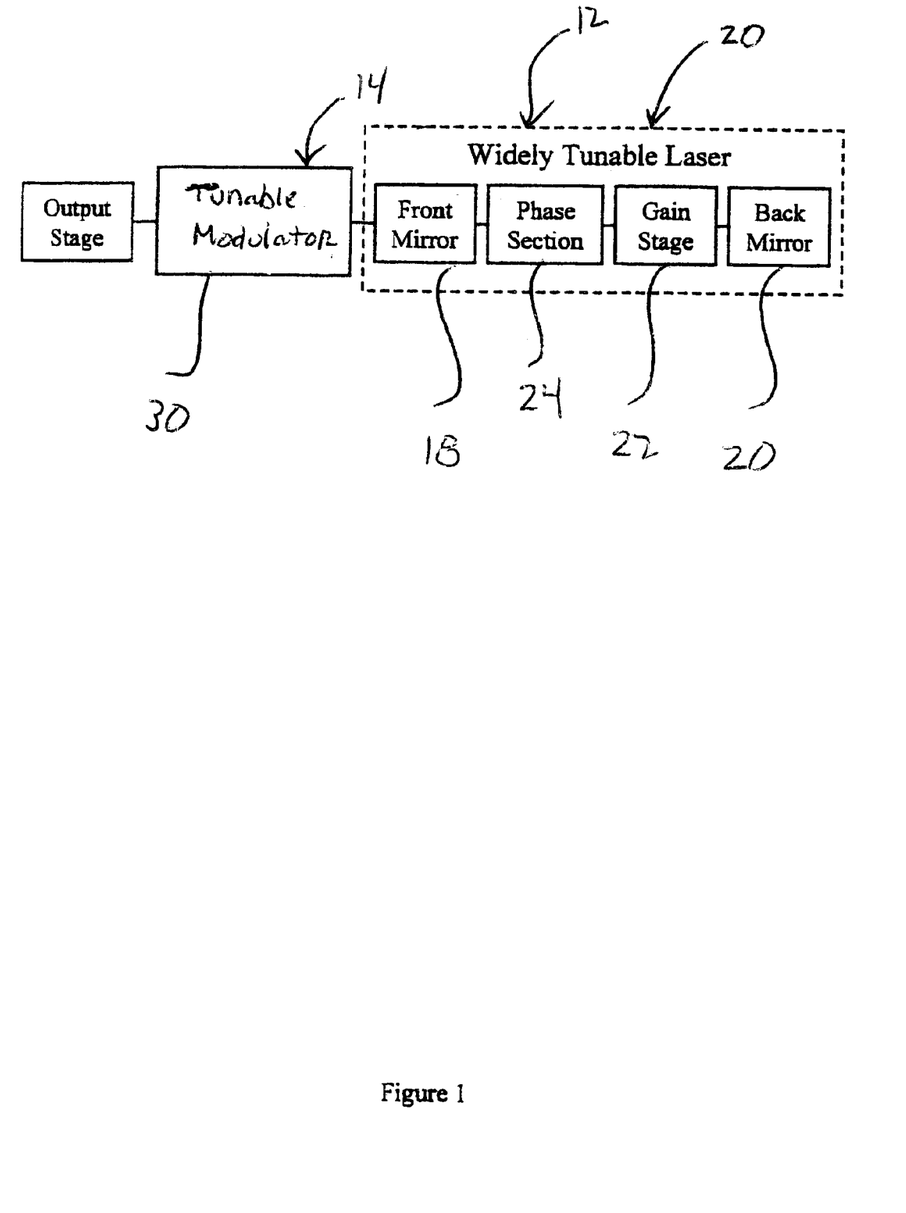
FIG. 1 is a block diagram of a laser assembly that illustrates different functional elements of a laser assembly including a widely tunable laser portion and a modulation portion.
Figure 2:
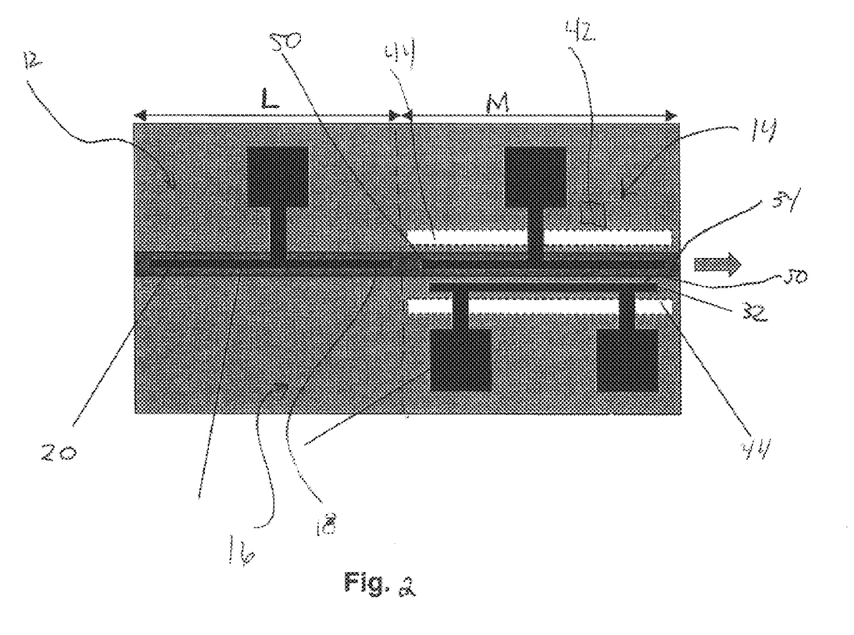
FIG. 2 is a plan top-down view of one embodiment of a tunable electro-absorption modulator in accordance with the present invention in combination with a widely tunable laser.

FIGS. 1 and 2 depict the present invention, a tunable electro-absorption modulator 14. The modulator 14 is depicted in combination and integrally formed with a widely tunable laser 20. The modulator 10, whether in combination with a widely tunable laser 20, is always formed on a substrate 16. The substrate may be Indium Phosphide, Gallium Arsenide, or some other substrate providing for the formation of active components thereupon.

The modulator 10 and the laser 20 are each part of an epitaxial structure formed on the substrate 16. For purposes of this specification, a widely tunable laser is defined as a laser whose output wavelength can be tuned over a wider wavelength range than achievable by conventional index tuning, i.e. whose wavelength selective elements are within the same optical waveguide, i.e. not a parallel array of DFB lasers.

Laser 12 includes front and back mirror sections 18,20 each of which comprises a mirror, such as a distributed Bragg reflector ("DBR") or some other well-known mirror material used in the art. A gain section 22 is positioned in laser 12 as is a mode selection section 24. Mode selection or phase section 24 can be a lateral mode selection element, a longitudinal mode selection element, a controllable phase shifting element, and the like. Such a laser is disclosed in U.S. Pat. No. 4,896,325 issued Jan. 23, 1988 to Larry A. Coldren and is incorporated herein by reference.

Laser 12 is preferably widely tunable to produce laser emission with the desired spectral properties, e.g. linewidth, SMSR, wavelength, over the entire wavelength band, or at least a significant fraction, to be used in a WDM optical communication system. In one embodiment, the wavelength bands of interest lie within 1300–1600 nm range and typically have a bandwidth determined by the gain characteristics of optical fiber amplifiers. The laser 12 is preferably an SG/SSG-DBR laser that includes two SG/SSG-DBR mirrors 18 and 20, gain section 22, and phase section 24. Jayaraman, V.; Chuang, Z.-M.; Coldren, L. A. "Theory, design, and performance of extended tuning range semiconductor lasers with sampled gratings.", IEEE Journal of Quantum Electronics, vol.29, (no.6), June 1993, p. 1824–34.

In this embodiment, the bandgap of the gain section 22 is chosen to provide gain over the wavelength band of interest. The bandgap of SG/SSG-DBR mirrors 18 and 20 and phase section 24 is selected to provide wavelength coverage over the desired wavelength band with the lowest loss and tuning currents. Other embodiments that can be used for laser 12 include but are not limited to the GCSR laser (Oberg, M.; Nilsson, S.; Streubel, K.; Wallin, J.; Backbom, L.; Klinga, T. "74 nm wavelength tuning range of an InGaAsP/InP vertical grating assisted codirectional coupler laser with rear sampled grating reflector," IEEE Photonics Technology Letters, vol.5, (no.7), July 1993, p.735–7) in which the output is taken from the SGISSG-DBR mirror side, allowing the integration of the other elements as illustrated in FIG. 1. Another embodiment for the widely tunable laser 12 is a series connected, gain coupled DFB laser. Hong, J.; Kim, H.; Shepherd, F.; Rogers, C.; Baulcomb, B.; Clements, S., "Matrix-grating strongly gain-coupled (MC-SGC) DFB lasers with 34-nm continuous wavelength tuning range," IEEE Photonics Technology Letters, vol.11, (no.5), IEEE, May 1999, p. 515–17.

Modulator 14 encodes data onto the optical carrier produced by widely tunable laser 12. The characteristics of the modulation that are desired are: suitable on/off ratio, control of the instantaneous wavelength such as chirp, low drive voltage, and high saturation power. For analog modulation it is desirable to have very linear response, as well.

Tunable modulator 14 is preferably an electro-absorption modulator 30. In accordance with the present invention, the bandgap wavelength of the modulator 14 is changed by locally heating the device. As shown in FIG. 2, a heating element 32 is integrated with the modulator 14 to achieve locally restricted heating. The integrated heating element 32 can be designed as a metal strip over or next to the modulator waveguide 34. An electrical current passed through the metal strip causes heating due to the ohmic resistance of the element.

When the local temperature of the electro-absorption modulator 14 changes, the bandgap energy of the waveguide changes as well. A higher temperature causes a decrease in the bandgap energy. A lower temperature causes an increase in the bandgap energy. The fundamental absorption of the waveguide 34 shifts accordingly to the change in bandgap energy. A temperature increase causes the absorption edge of the waveguide 34 to shift towards longer wavelengths. The applied electric field causes an increase in the absorption below the bandgap energy. The amount of this increase is the highest at the bandgap energy and smaller for lower energies. The applied electrical field causes quasi-periodic slight increase and decreases of the absorption in the semiconductor for photon energies above the bandgap energy. These oscillations are called Franz-Keldysh oscillations and they are superimposed to the fundamental absorption of the semiconductor. The increase in the absorption below the bandgap energy moves with changing temperature according to the change in the bandgap energy of the waveguide. The shape of the absorption over wavelength function remains basically unchanged.

The local heating is extremely useful if, as depicted in FIGS. 1 and 2, the modulator 14 is integrated with other elements, such as a widely tunable laser 12, since the bandgap wavelength of the modulator 14 can be optimized without substantially affecting the other devices. The optimization of the bandgap wavelength of the modulator 14 gives another degree of freedom and enables the setting of transmission and chirp of the modulator 14 during its operation.

The temperature of the modulator 14 can be controlled by an external thermo-electric cooler (TEC) 40. TECs are well known in the art. A temperature sensor 42 can also be integrated in proximity to the modulator to monitor the temperature of the locally heated area. Such temperature sensors are well known to those skilled in the art and as such shall not be discussed with addition specificity herein.

Figure 4:
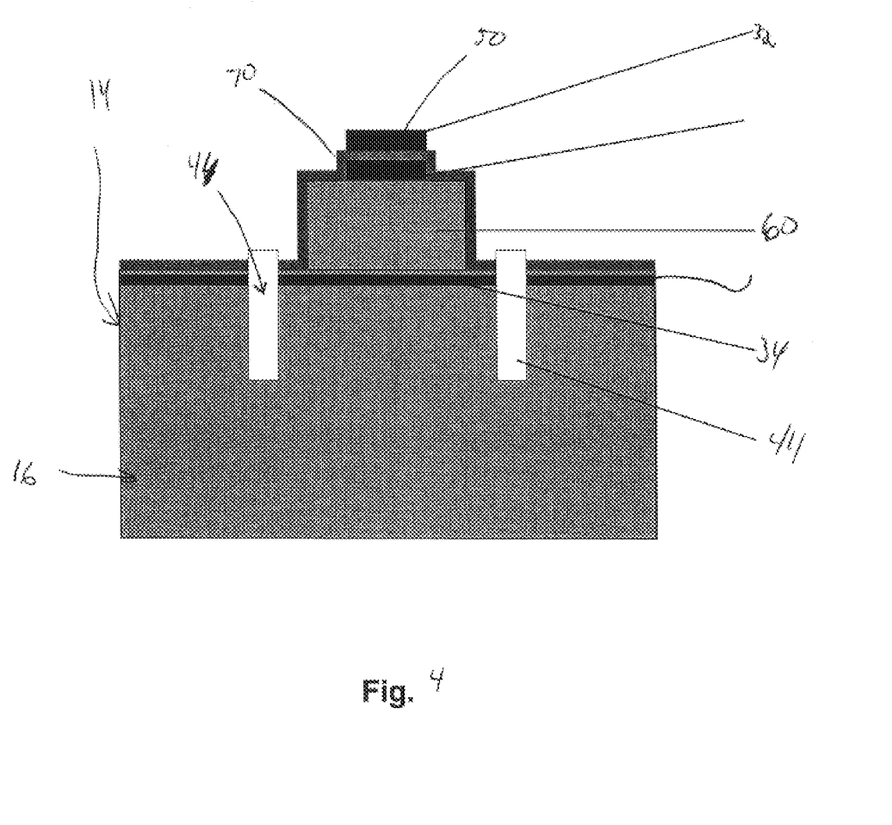
FIG. 4 is a cross sectional view of an electro-absorption modulator having an insulating area disposed beneath a waveguide layer.

As depicted in FIGS. 2 and 4, at least one trench 44 can be integrated in the chip around a central modulator portion 46 to improve the localization of the heating effect. Although depicted in FIGS. 2 and 4 as two trenches 44,44, it is possible to contain enough current to ensure functioning of the modulator 14 with at least one trench 44. The trench 44 substantially decreases lateral current flow. Therefore, the amount of dissipated power to achieve a certain temperature increase is lessened and the overall efficiency of the tunable modulator 14 is enhanced. The central modulator portion 46 intersects the waveguide 34 preferable at a substantially right angle thereto. Additionally, the central modulator portion 46 comprises an integrated heating element 48.

Figure 3:
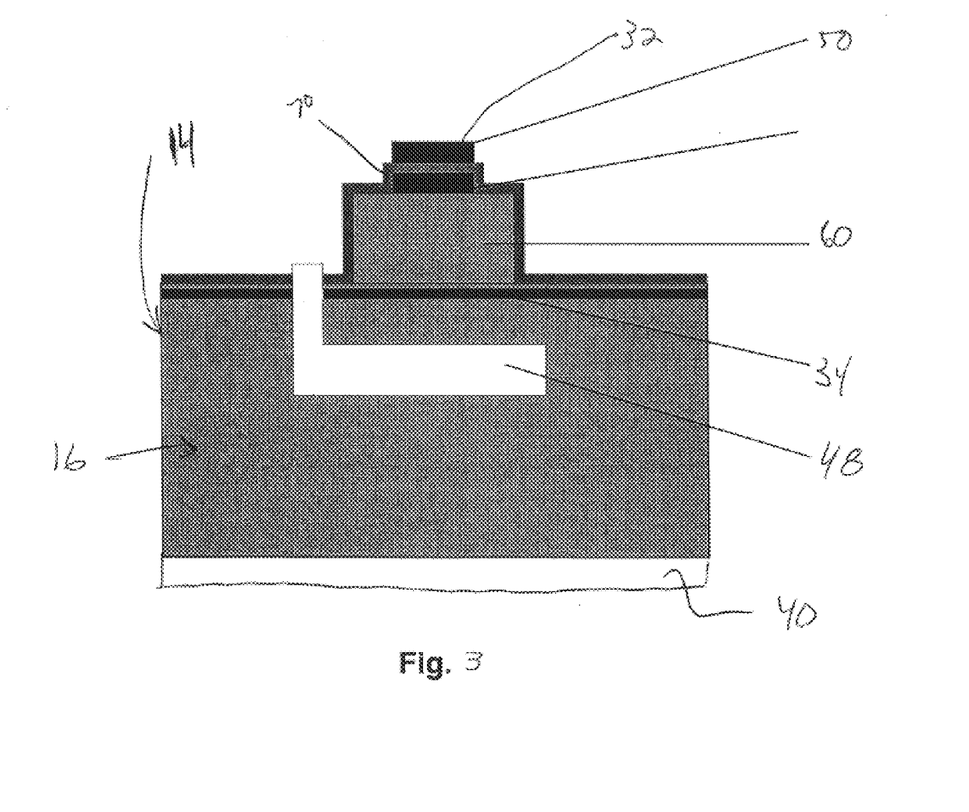
FIG. 3 is a cross sectional view of an electro-absorption modulator having an insulating area disposed beneath a waveguide layer.

Alternatively, and as depicted in FIG. 3, the waveguide 34 of the electro-absorption modulator can be selectively underetched. Methods for underetching are well known to those skilled in the art. The light passes through the modulator 14 in the waveguide 34, which is underetched. The underetched portion 48 of the chip can be refilled with other materials that have a low thermal conductivity. One example is BCB, bisbenzo-cyclo-buthene, manufactured by Dow Chemical Company. Suitable materials having low thermal conductivity are well known in the art.

Generally, a metal strip 50 can serve as the heating element 32. Alternatively, the heating element 32 may be formed from a semiconductor material. The heating element 32 can be employed atop, beneath, or beside the waveguide 34 to achieve the heating effect. If a semiconductor is used to serve as the heating element, the semiconductor can consist of a homogeneously doped material or might include a pn-junction. The heating element might only be applied to a portion of the modulator waveguide section or two or more individual heating elements might be employed. This scheme enables a local heating of the modulator waveguide with a different amount along the waveguide. The advantage is that the amount of absorption along the waveguide can be controlled. For example in a normal modulator structure most of the light is absorbed in the beginning section of the modulator since the decay of light intensity in a medium with optical loss is exponential. A self heating effect might occur in the waveguide if the absorbed light intensity is too high. Having a lower absorption in the beginning section of the modulator and a higher absorption towards the end would enable a more uniform absorption of the light power. This could be accomplished by local heating at the end of the modulator section.

One example of the implementation of the present invention is the integration of the tunable electro absorption modulator 14 with a tunable laser diode 12. MOCVD is used for the epitaxial growth of the 34 waveguide and optical gain medium 22 layers on the substrate 16, formed from some III-V material, such as InP. InP or InGaAsP layers of composition y of approximately 2 µm (for a laser in the 1.55 µm wavelength range this layer could vary in thickness between 0.5 µm and 3 µm. Larger thicknesses would technically be possible, but are not necessary and would just degrade device performance) thickness are employed as cladding layers around the approximately about 0.4–0.3 µm thick InGaAsP (the waveguide layer thickness might vary between 0.1 µm and 1 µm) waveguide layer with composition x. The compositions of the layers are adjusted such that all the layers are lattice matched to the InP substrate and the x layer has a smaller bandgap energy, thus a higher refractive index than the layers of composition y. The waveguide layer x composition could be In0.65Ga0.35As0.75P0.25. This composition corresponds to a bandgap wavelength of 1.4 µm. The cladding layer could be InP or another InGaAsP layer where the P content is increased above the above mentioned 25% with an InGa ration to maintain the lattice constant of the InP substrate.

The epitaxial growth process starts with the growth of the lower n-type doped cladding layer. The next layer is the waveguide layer 34 which also includes optical active quantum wells and barrier layers. The growth process is interrupted at this point. The quantum wells are etched off except for the area of the laser diode 12.

Gratings are defined by holography and are etched in the waveguide layer 34 where the mirror sections 18, 20 of the tunable laser 12 are located. The front and back mirror sections 18,20 of the laser 12 consist of a waveguide 34 with burst of gratings equally spaced over the length of the mirror sections 18,20. The gratings exhibit a period which corresponds to a half wavelength of the laser light in the waveguide. In comparison to a standard DFB laser the bursts generate a periodical reflectivity spectrum.

After grating formation, a second epitaxial growth process is employed. This regrowth process starts with the growth of the remaining waveguide layer and the upper p-type doped cladding layer. Finally, a highly p-type doped InGaAs layer is grown to facilitate an ohmic contact to the device or chip later on.

Device processing starts with the formation of a ridge 60, which is shown in FIGS. 3 and 4. The ridge 60 provides for lateral optical and lateral current confinement. The ridge 60 is defined by standard photolithography and transferred into the semiconductor by a combination of dry and wet chemical etching processes. The depth of the ridge is typically from the surface just above the active/waveguide layer. A passivation material like Si3N4 is deposited on the entire wafer and is subsequently removed on top of the ridge 60 where contact to the laser and modulator will be made. Standard metallizations like TiPtAu can be employed to contact the laser and the modulator sections on the p-side of the wafer. The n-metal is typically deposited after wafer thinning on the substrate side of the wafer and may comprise AuGeNiAu (Please provide a second example of another compound or metal that may be used here). An implantation of hydrogen ions can be incorporated in the wafer processing to electrically insulate the modulator 14 and the laser section 12, as well as each of the different sections 18,20, 22,24 in the laser. The device consists then of a back mirror section, a phase section, a gain section, a front mirror section, and the modulator section.

At this point the heating element can be added to the modulator 14. In the simplest approach an electrical resistive metal is evaporated on the wafer. Electrical resistive metals include CrNi and TiW, both of which are well known in the art. Poly-Si is another option. Patterning of the metal is accomplished by a standard and well known lift-off technique. The metal stripe is located just over the ridge of the modulator as shown in FIGS. 2 and 4. A thin insulator 70 such as a dielectric material like Si3N4 is used to electrically insulate the heating element from the electrode metal of the modulator (FIG. 3). A typical example for the heater metal is NiCr.

As an alternative the metal stripe could also be put on the side of the waveguide. A deep trench can be etched around the modulator section to concentrate the heat in the waveguide of the modulator.

After all wafer-level processes have been completed the wafer is cleaved into individual chips. An AR coating might be deposited on the facet of the chip to avoid back reflections into the laser. Testing and mounting procedures are performed.

The wavelength of the tunable laser 12 is selected by changing the currents into the mirror 18,20 and the phase 24 sections of the device. According to the lasing wavelength the bandgap wavelength of the modulator 14 is selected to optimize system performance. The bandgap wavelength of the modulator 14 is adjusted by setting the current through the heating element 32. The heating element 32 dissipates heat energy which increases the temperature of the modulator waveguide 34. The amount of current which is necessary to achieve a specific bandgap wavelength of the modulator 14 is typically determined in a calibration measurement run. The data is stored in a memory type device and the current will be applied according to the stored data. The time constant until the temperature reaches equilibrium is typically in the order of micro-seconds. Special peak circuit designs can be employed to decrease the time constant for higher wavelength tuning speeds.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A tunable modulator assembly, comprising:
   a substrate;
   an epitaxial structure formed on the substrate;
   a modulator formed in the epitaxial structure; and
   a heating element adjacent the modulator;
   wherein the modulator comprise a trench.
2. The assembly of claim 1, wherein the heating dementia disposed atop the modulator.
3. The assembly of claim 1, wherein the heating element comprises a metal.
4. The assembly of claim 3, where the metal is selected from the group comprising NiCr and TiW.
5. The assembly of claim 1, wherein the modulator includes an optical waveguide.
6. The assembly of claim 1, where the heating element comprises poly-Si.
7. The assembly of claim 1 where the modulator is integrated with a tunable laser diode.
8. The assembly of claim 1 where the heating element is integrated in the form of a pn-junction.
9. The assembly of claim 1, where the heating element comprises a plurality of heating elements.
10. The assembly of claim 9, where the plurality of heating elements provide local heating of a waveguide of the modulator with a different amount of heating along the waveguide.
11. The assembly of claim 1, where the modulator comprises a plurality of trenches.
12. The assembly of claim 1, where the modulator includes an underetched portion.
13. The assembly of claim 12, where the underetched portion is filled with a material having a low thermal conductivity.
14. The assembly of claim 1, where the heating element is disposed on a thin insulator to electrically insulate the heating element from an electrode of the modulator.
15. The assembly of claim 1, where the heating element comprises a metal strip along side a waveguide of the modulator.
16. The assembly of claim 1, further comprising a thermo-electric cooler for controlling the temperature of the modulator.
17. A tunable modulator assembly, comprising:
    a substrate;
    an epitaxial structure formed on the substrate;
    a modulator formed in the epitaxial structure; and
    a heating element adjacent the modulator;
    where the modulator includes an underetched portion.
18. The assembly of claim 17, wherein the heating element is disposed atop the modulator.
19. The assembly of claim 17, wherein the heating element comprises a metal.
20. The assembly of claim 19, where the metal is selected from the group comprising NiCr and TiW.
21. The assembly of claim 17, wherein the modulator includes an optical waveguide.
22. The assembly of claim 17, wherein the modulator comprises a trench.
23. The assembly of claim 17, where the heating element comprises poly-Si.
24. The assembly of claim 17, where the modulator is integrated with a tunable laser diode.
25. The assembly of claim 17, where the heating element is integrated in the form of a pn-junction.
26. The assembly of claim 17, where the heating element comprise a plurality of heating elements.
27. The assembly of claim 26, where the plurality of heating elements provide local heating of a waveguide of the modulator with a different amount of heating along the waveguide.
28. The assembly of claim 17, where the modulator comprises a plurality of trenches.
29. The assembly of claim 17, where the underetched portion is filled with a material having a low thermal conductivity.
30. The assembly of claim 17, where the heating element is disposed on a thin insulator to electrically insulate the heating element from an electrode of the modulator.
31. The assembly of claim 17, where the heating element comprises a metal strip along side a waveguide of the modulator.
32. The assembly of claim 17, further comprising a thermo-electric cooler for controlling the temperature of the modulator.

* * * * *

UNITED STATES PATENT AND TRADEMARK OFFICE
CERTIFICATE OF CORRECTION

PATENT NO.    : 6,665,105 B2
DATED         : December 16, 2003
INVENTOR(S)   : Torsten Wipiejewski It is certified that error appears in the above-identified patent and that said Letters Patent is hereby corrected as shown below:

Title page,
Figure 2 and Figure 3, should appear as follows:

Drawings,
Delete Sheets 1-4, and insert the attached Sheets 1-4.

Column 7,
Line 49, "dementia" should read -- element --.
Line 56, "clement" should read -- element --.

Signed and Sealed this

Fourteenth Day of September, 2004

JON W. DUDAS
*Director of the United States Patent and Trademark Office*